June 12, 1956 J. S. MURRAY 2,750,458

AUTOMATIC TRUNK ROUTINER

Filed Aug. 6, 1953 4 Sheets-Sheet 1

INVENTOR.
JAMES S. MURRAY

BY Wm. Walter Owen.

ATTY.

AUTOMATIC TRUNK ROUTINER

Filed Aug. 6, 1953 4 Sheets-Sheet 2

INVENTOR.
JAMES S. MURRAY
BY Wm. Walter Owen.
ATTY.

June 12, 1956 J. S. MURRAY 2,750,458

AUTOMATIC TRUNK ROUTINER

Filed Aug. 6, 1953 4 Sheets-Sheet 3

TRUNK IDENTITY SWITCH 300

INVENTOR.
JAMES S. MURRAY
BY Wm. Walter Owen
ATTY.

June 12, 1956 J. S. MURRAY 2,750,458

AUTOMATIC TRUNK ROUTINER

Filed Aug. 6, 1953 4 Sheets-Sheet 4

INVENTOR.
JAMES S. MURRAY

BY Mc Watters Owen

ATTY.

United States Patent Office 2,750,458

Patented June 12, 1956

2,750,458

AUTOMATIC TRUNK ROUTINER

James S. Murray, Tampa, Fla., assignor to Automatic Electric Laboratories, Inc., Chicago, Ill., a corporation of Delaware Application August 6, 1953, Serial No. 372,743

18 Claims. (Cl. 179—175.2)

This invention relates in general to telephone systems and more particularly to routining equipment therein.

It is an object of this invention to provide, in a small unattended exchange, a novel, compact, inexpensive and simplified routiner for automatically testing each repeater in the exchange for seizure, satisfactory impulse repetition and battery reversal.

A feature of this invention is the provision for dual automatic and manual control of the routiner.

A feature of this invention is the provision for automatic and manual control of the routiner at the unattended exchange as well as control of the routiner from a distant attended office.

Another feature of this invention is the new and novel impulsing device.

A further feature of this invention is the new and novel means by which an attendant at a distant point may identify which repeater is in trouble.

Further features will be evident upon an examination of the following disclosure in which.

Figure 1:
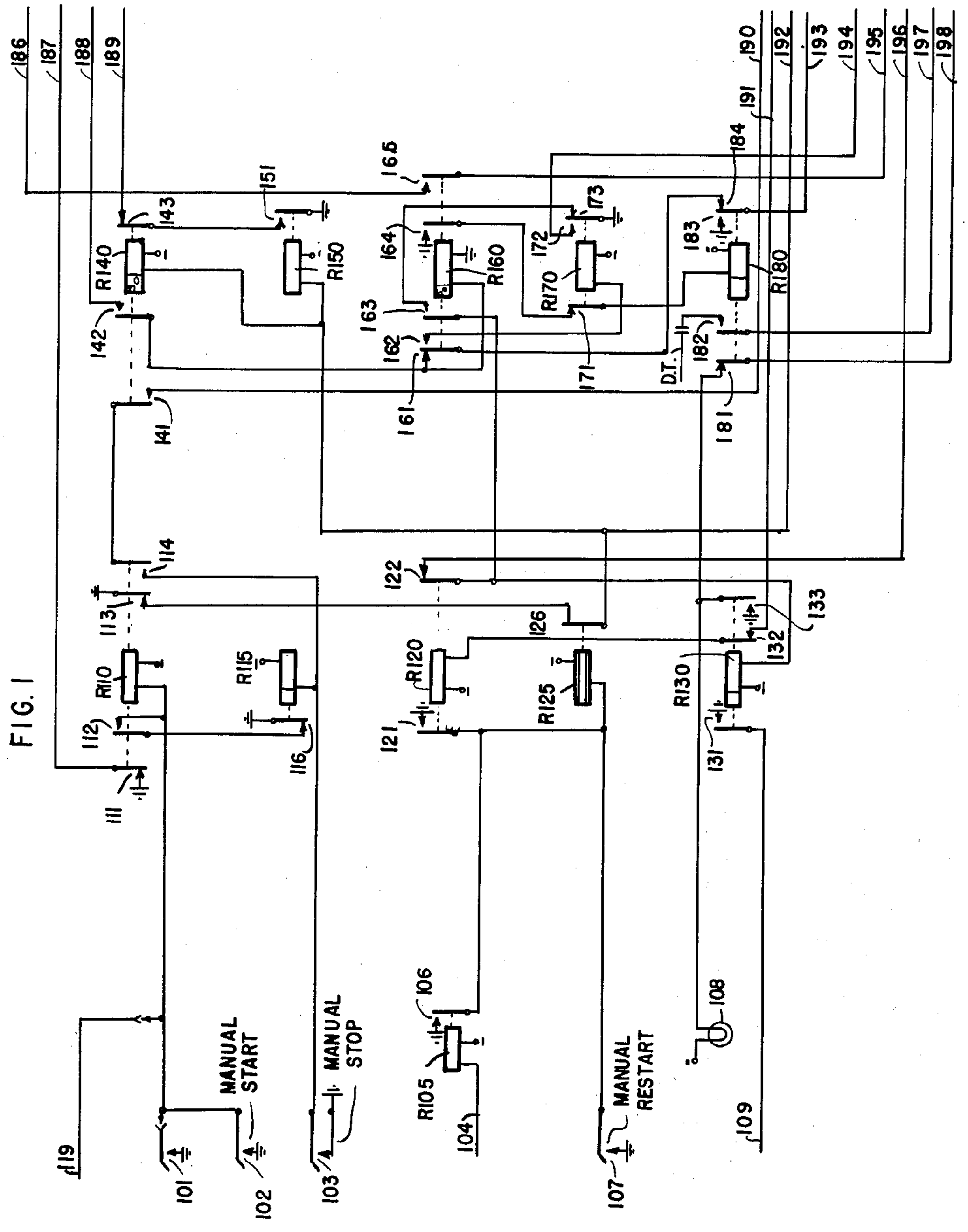
Fig. 1 shows the control relays of the routiner.
Figure 2:
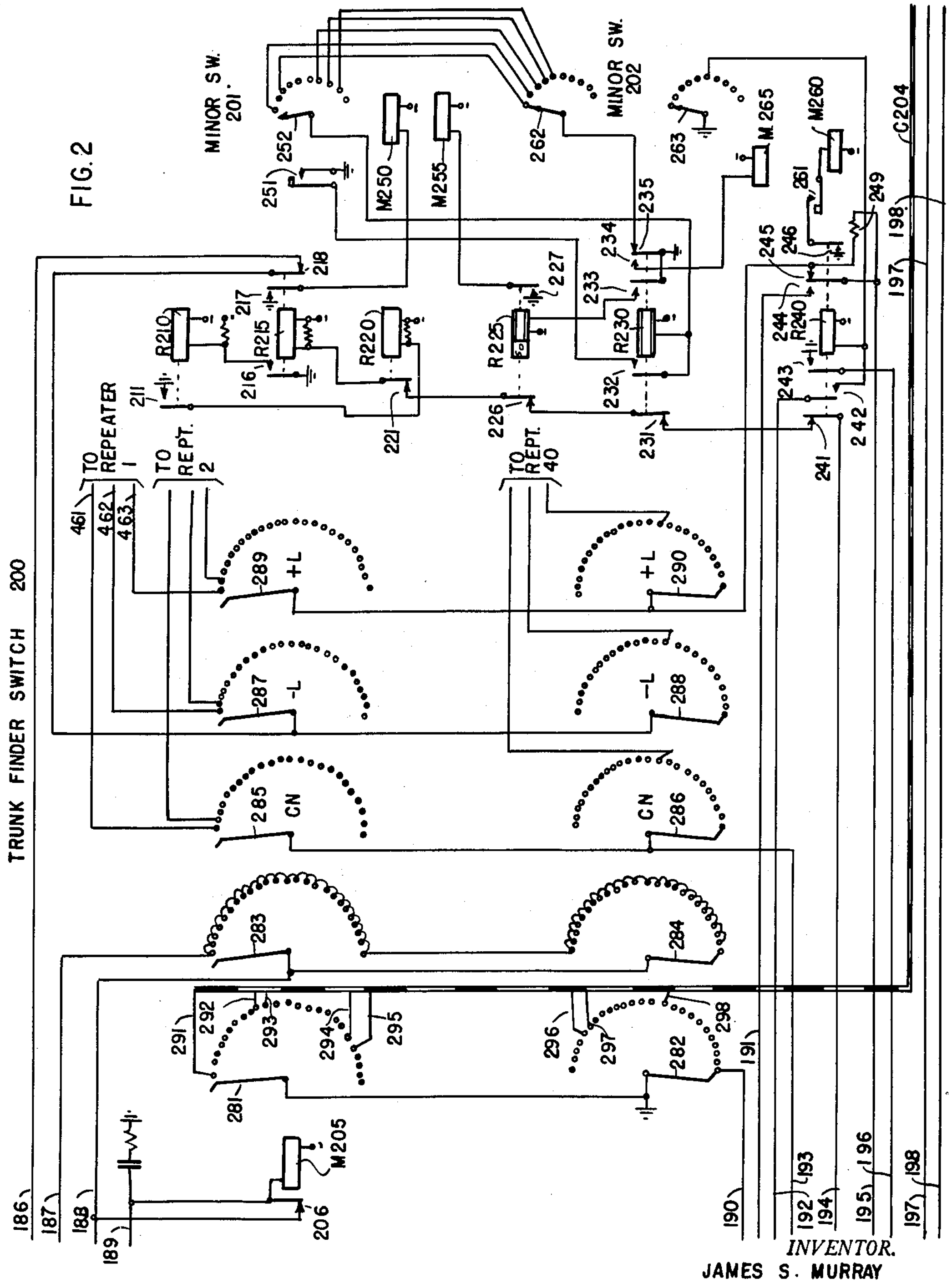
Fig. 2 shows the finder switch for successively seizing each trunk line with which a repeater is associated, and also shows the impulsing device.
Figure 3:
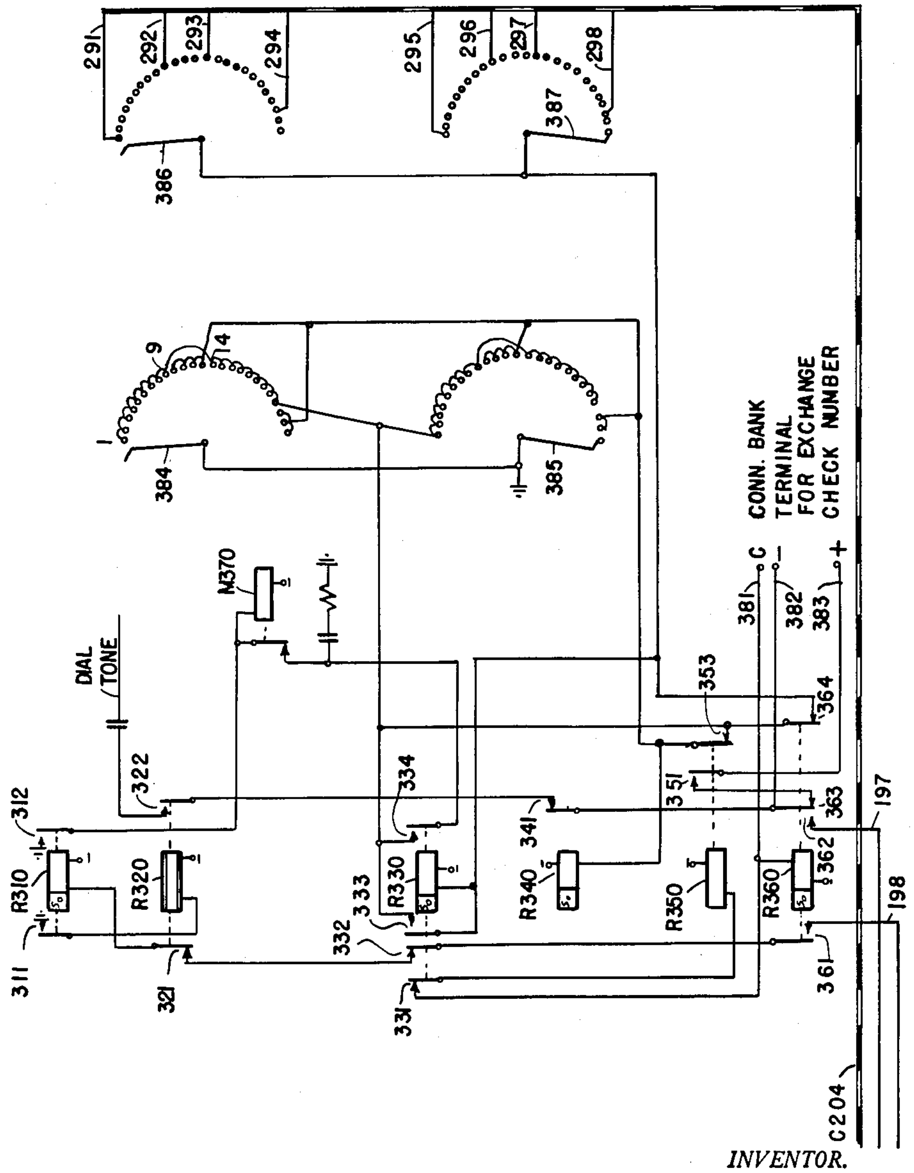
Fig. 3 shows the trunk identity switch.

The routiner is designed such that it may be started locally by manual or automatic clock-controlled means or it may be started by relay means operated in response to an attendant at a distant attended office dialling a predetermined number. Once started, the routiner will automatically seize and test each idle repeater, "skipping" over busy repeaters.

When an idle repeater cannot be seized, the routiner operates an alarm or signal, both in its own unattended office and in the attended office. By dialling a predetermined check number of the exchange in which the routiner is located, the attendant makes connection to a certain connector bank terminal in the unattended exchange. The routiner sends uninterrupted dial tone to the attendant by way of said connection thereby to inform him that one of the repeaters cannot be seized. No attempt is made in the preferred embodiment to identify the faulty repeater since the trouble is obviously in the unattended exchange and a repairman must be dispatched to said exchange to correct the fault.

When a repeater is seized, the routiner generates impulses for a reverse battery test number and sends said impulses to the seized repeater, the repeater transmitting said impulses over its associated trunk to complete connections to a reverse battery test position in the attended office. Battery reversal occurs instantaneously upon completion of connections to said test position. A reverse battery test is made in the routiner; and, upon satisfactory completion of the test, the routiner releases the repeater to seize the next accessible repeater. To satisfy said test, battery reversal must be instantaneous.

When an idle repeater is seized but does not satisfy the reverse battery test, the routiner operates the alarm or signal in both offices. But now, after the attendant dials the check number, the routiner sends intelligible interrupted splashes of dial tone, the number of splashes identifying the number of the repeater in trouble. The tone splashes are received in groups of ten for easier identification. The attendant, having identified the number of the repeater and the trunk associated therewith, can now check the incoming switch connected to said associated trunk at the attended office and trace the call from said switch to determine whether or not the source of the trouble is in the attended office equipment rather than in the repeater. When the attendant finds the trouble in the attended office or determines that the trouble is located at the unattended office, he can dial a predetermined number to cause the routiner to step to the next repeater to continue the testing procedure.

Busy repeaters are not tested since elaborate, expensive equipment would be required. Further, the routiner is to be operated during hours when the traffic is lightest so that few repeaters will be found busy.

*Operation of routiner when no trouble is encountered*

In response to the momentary closure of contacts 101 by an automatic start device in the local, unattended office or in response to the grounding of conductor 119 by way of an interoffice switch train when an attendant at a distant attended exchange dials a predetermined number, start relay R110 will operate over an obvious circuit and lock itself operated over an obvious circuit including contacts 116 of the stop relay R115.

At contacts 111, R110 removes ground potential from the finder switch levels accessible to wipers 283 and 284; at contacts 113, completes obvious circuits for operating relay R150 and slow to operate relay R140; and, at contacts 114, prepares a circuit for operating stop relay R115.

Since R140 is slow to operate, R150 will operate and complete a circuit over contacts 151 and 143, conductor 189 and the winding of the finder switch motor magnet M205 for energizing said magnet.

It will be noted that switch 200 is a ten level, 25 point rotary switch having single-ended wipers. The lower set of wipers are offset 180° from the upper set in order to simulate a five level 50 point switch. The upper set of wipers will engage their respective contacts; then the lower set of wipers will in turn engage their respective contacts.

Figure 4:
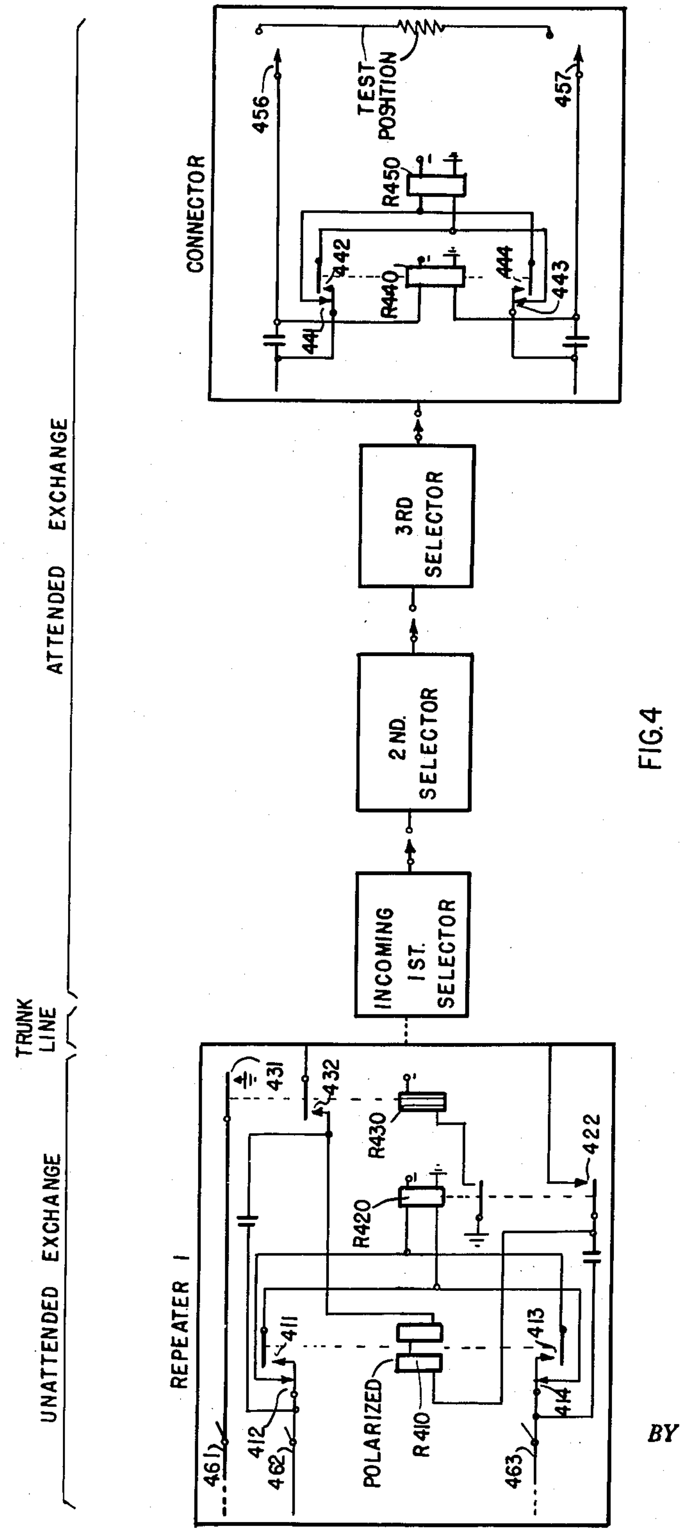
Fig. 4 shows a typical repeater circuit, part of a connector and in block diagrams a first, second and third selectors in the unattended office.

When R140 operates, it opens contacts 143 to restore M205, to thereby advance the finder switch wipers one step to select repeater 1 which we will assume to be the repeater shown in Fig. 4 over wipers 285, 287 and 289. At contacts 141, R140 completes a circuit extending from grounded wiper 282, the last contact accessible thereto, conductor 190, contacts 141 and 114 to the winding of the stop relay R115 for operating R115. But, since R115 is slow to operate, wiper 282 will be advanced from its last contact to open said circuit before R115 can operate. At contacts 142, R140 completes a circuit extending from battery through the winding of M205, over contacts 206, conductor 188, contacts 142 and the winding of slow to operate relay R160 for operating R160 but not M205. A branch of this circuit, extending over contacts 161 and 184, conductor 193, wiper 285 and its first contact, and the private conductor 461 of repeater 1 will cause R160 to be short circuited and M205 to operate if repeater 1 is busy since, when busy, ground from contacts 431 is placed on the private conductor of the repeater. In this manner, the routiner will "skip" over busy repeaters.

Assuming that repeater 1 and the trunk associated therewith are idle, R160 will operate over the previously described circuit. At contacts 165, R160 completes a circuit including battery through the upper winding of relay R420, contacts 412, conductor 462, wiper 287, contacts 218, conductors 186 and 195, contacts 245, wiper 289, conductor 463 and contacts 414, and the lower winding of relay R420 to ground, for operating the line relay R420 of repeater 1.

Assuming that no trouble is encountered in repeater 1, its line relay R420 will operate to close the circuit of hold relay R430 which will operate and return ground from contacts 431, over the private conductor 461, wiper 285, conductor 193 and contacts 184 and 162 to relay R170 to operate R170; R420 and R430 complete at contacts 422 and 432 a pulsing circuit extending over the trunk line to the incoming selector, including the winding of polar relay R410.

At contacts 171 and 173, R170 opens circuits over which slow to operate relays R180 and R130 (as will be described later) would have operated if repeater 1 had not returned ground to operate R170; and, at contacts 172, starts the impulsing device by extending ground over conductor 194 and contacts 241, 231, 226 and 221 to the winding of pulsing relay R215 to operate R215.

At this time, relays R110, R140, R150, R160, R170 and R215 are in an operated position.

*Operation of the impulsing device*

For the purpose of clarity and ease of explanation, a simplified repeater circuit has been shown in Fig. 4 together with its trunk line terminating in an incoming selector (shown by block diagram). Second and third selectors are shown in block diagram; and only those circuits of a connector as are necessary to show battery reversal are shown. A test position in the contact banks of the connector is shown.

The impulse sender comprises a minor switch 201 having a wiper 252 which controls the sending of impulses until a marked contact in its bank is encountered. It also includes a minor switch 202 having wipers 262 and 263, the first of which sequentially marks the contacts of wiper 252 for each successive digit to be sent, while wiper 263 acts as an end of sending control.

The number of impulses per series of impulses and the number of series of impulses are determined by the strapping of the contact banks of minor switches 201 and 202. Each succeeding bank contact accessible to wiper 262 is connected to a predetermined bank contact accessible to wiper 252. The position of the contact accessible to wiper 262 determines the series of impulses being transmitted, that is, a first series of impulses is transmitted as wiper 252 steps from contact to contact while wiper 262 is in engagement with its first contact and a second series is transmitted while wiper 262 is in engagement with its second contact and so on until wipers 262 and 263 engage their sixth contacts at which time relay R240 operates to stop the impulsing device. The positions of the predetermined contacts of minor switch 201, which are strapped to each of the first five contacts accessible to wiper 262, determine the number of impulses in the respective series of impulses, that is, one impulse if the predetermined contact is the first contact in minor switch 201, two impulses if it is the second contact and so on. As shown, the first, second, third, fourth and fifth contacts accessible to wiper 262 are connected respectively to the third, first, seventh, eighth and ninth contacts accessible to wiper 252 thereby to transmit the five digit code number 31789, which number for purposes herein will be a reverse-battery test number of the attended office.

Therefore, when R170 operates R215, the latter relay completes at contacts 216 a circuit for operating relay R210; at contacts 218, opens the above-mentioned operating circuit of the line relay R420 of repeater 1 to restore said relay; and, at contacts 217, completes a circuit for energizing motor magnet M250 of minor switch 201. Contacts 217 close and contacts 218 open before contacts 216 close.

M250 upon energizing steps wiper 252 to the first bank contact.

At contacts 211, R210 will complete a circuit for operating relay R220. At contacts 221, R220 opens the above-mentioned operating circuit of R215.

R215 restores to restore R210 and M250 and also to close contacts 218 to reoperate the line relay R420 of repeater 1. R210 restores R220 and the operating circuit of pulsing relay R215 is again completed at contacts 221. It will be noted that the operating and release characteristics of relays R210, R215 and R220 are controlled so as to properly time each impulse.

This sequential operation of R210, R215, R220 and M250 continues until three impulses have been transmitted at which time wiper 252 engages its third contact to complete a circuit including contacts 235, wipers 262 and 252 and the winding of slow to release relay R230 to operate said relay.

At contacts 231, R230 opens at a second point the operating circuit of pulsing relay R215 before R220 can restore contacts 221 to recomplete said operating circuit; at contacts 232, which operate before the other relay contacts, completes an obvious circuit including off-normal contacts 251 of minor switch 201 for maintaining itself operated; at contacts 234, completes an obvious circuit for energizing motor magnet M265 of minor switch 202, which magnet steps wipers 262 and 263 to their second bank contacts in preparation for a second series of impulses; and, at contacts 233, completes an obvious circuit for operating the slow to operate and slow to release relay R225. R225 closes contacts 227 to operate release magnet M255 of minor switch 201 thereby to restore wiper 252 to normal. Off-normal contacts 251 open to restore R230; M265 restores; and R225 restores followed by the restoration of M255. Contacts 226 close when R225 restores to again complete the operating circuit for pulsing relay R215. The impulsing device is now ready to transmit a second series of impulses.

R420 repeats each of said three impulses to the incoming selector switch which selects a desired second selector in a manner well known in the art.

In a similar manner, a second, third, fourth and fifth series of impulses consisting respectively of one, seven, eight and nine impulses will be transmitted. In response to said second, third, fourth and fifth series of impulses connections will be completed over a second and third selector, and a connector, for example those shown in Fig. 4, to the test position shown in Fig. 4. Line relay R450 of the connector will operate over a circuit including contacts 441 and 443, the switch train and trunk line of Fig. 4, contacts 432 and 422 and the polarized relay R410. R410 will not operate in this circuit. At the beginning of the fifth series of impulses, when M265 operates in a manner similar to that described with respect to the first series of impulses to step wipers 262 and 263 to their sixth contacts, an obvious circuit including wiper 263 will be completed to operate relay R240. At the end of the fifth series of impulses, the connector wipers 456 and 457 seize the test position to complete an obvious circuit for operating the back bridge relay R440, which reverses at contacts 442 and 444 the connections to line relay R450, thereby to reverse current flow in the operating circuit of R450. This will cause R410 to operate and reverse the battery connections to conductors 462 and 463.

At contacts 241, R240 opens the operating circuit of pulsing relay R215; at contacts 242, completes a circuit including conductor 192 and contacts 126 and 113 for maintaining itself operated; at contacts 243, completes an operating circuit for the slow to operate alarm relay R130, said circuit extending from grounded contacts 243, over conductor 196 and contacts 122 to R130; at contacts 244, prepares a test circuit for reverse battery test relay R120; and, at contacts 246, completes a circuit including off-normal contacts 261 of minor switch 202 for operating release magnet M260 to restore wipers 262 and 263 to normal. Off-normal contacts 261 open to restore M260.

When impulsing is completed, relays R110, R140, R150, R160, R170 and R240 as well as relays R420, R430, R450 and, if no trouble is encountered, R440 and R410 are in an operated position.

*Reverse battery test—no fault encountered*

When R240 operates to open, at contacts 245, the previously described circuit for operating the line relay R420 of repeater 1, said line relay is maintained operated over a circuit similar to its operating circuit with resistance 249 shunting open contacts 245.

R120 will not operate in series with resistance 249 in the circuit extending from negative battery on R120, over contacts 132, conductor 191, contacts 244, resistance 249, wiper 289, conductor 463 and contacts 414 to positive battery on the repeater line relay R420.

However, if R410 operates rapidly after said series of impulses to reverse connections to line relay R420 then R120 will operate over a circuit extending from negative battery on R120, over contacts 132, conductor 191, contacts 244, conductor 195, contacts 165, conductor 186, contacts 218, wiper 287, conductor 462, contacts 411 to positive battery on the line relay R420 of repeater 1. This battery reversal and the operation of R120 must be completed before the slow to operate alarm relay R130 can operate over the previously described circuit completed by R240 at contacts 243. R120 opens said operating circuit of R130 at contacts 122; and, at contacts 121, completes an obvious circuit for operating slow to release relay R125.

At contacts 126, R125 restores relays R150, then R140 and also R240. R240 causes R120 to restore and R140 causes R160 to restore, followed by the restoration of R170.

R125 releases slowly in response to the restoration of R120 and only R110 is operated. R125 restores to reclose the operating circuits of R140 and R150 and the routiner is ready to select and test repeater 2 (not shown). In this manner, the routiner will test each idle repeater and "skip" over each busy repeater until the wipers of the trunk finder switch 200 engage their forty-first contacts, at which time a self-interrupting circuit extending from the multipled contacts accessible to wiper 286, over said wiper, conductor 193, contacts 184, 161, 142 and 206 and conductor 188 to the winding of magnet M205 will be completed upon the operation of R150 and R140 to cause M205 to advance the finder wipers to their last contacts. A circuit extending from grounded wiper 282, over its last contact, conductor 190, contacts 141 and 114 to the stop relay R115 is completed to operate the stop relay. At contacts 116, R115 restores the start relay R110, R140 and R150 restoring in response to the restoration of R110.

*Non seizure of a faulty, idle repeater*

Assume that, upon the initial operations of R110, R150, M205, R140 and then R160 when absence of ground was encountered on the private conductor 461 of repeater 1 to indicate the idle condition of said repeater, the repeater line and/or hold relays did not function properly to return ground over the previously described circuit for operating relay R170.

As a result of the failure of R170 to operate, slow to operate relay R130 would operate over a circuit including contacts 173 and 163; and slow to operate relay R180 would operate over a circuit including contacts 164 and 171.

At contacts 131 and 133, R130 operates respectively the alarm in the distant office over conductor 109 and the local signal lamp 108.

At contacts 182, R180 extends dial tone from dial tone equipment (not shown), over conductor 197 to open contacts 362; and, at contacts 183 and 184, opens the operating circuit of R170 and extends busy marking ground potential over conductor 193 and wiper 285 to the private conductor 461 of repeater 1.

When the attendant at the attended office hears the alarm and dials the check number of the unattended office to make connections to the connector bank contacts 381, 382 and 383, the switching relay of the connector associated with said contacts will operate in series with relays R350 and R360 in a manner well-known in the art and extend direct ground potential to contact 381 to operate R350 and slow to operate R360.

R350 closes contacts 351 to operate the ring-cut-off relay of the connector in a manner well-known in the art over a circuit including contacts 383, 351, 363 and 382 before R360 operates to open said circuit. The ring-cut-off relay locks itself operated in a manner well-known in the art.

R360 closes contacts 362 to extend dial tone over contact 382 to the attendant in the attended office. A steady dial tone indicates non-seizure of a faulty repeater. Since the fault is necessarily at the unattended exchange, no provision is made for identifying the repeater in trouble.

When a repairman corrects the trouble, he can operate a push button of the routiner to close contacts 107 to operate relay R125 and the routiner will continue to select and test the remaining repeaters and the trunks associated therewith.

*Operation of the trunk identity switch—fault located by reverse battery test*

Repeaters 1 to 40 are connected to the first 40 bank positions of trunk finder switch 200. The first 40 bank contacts accessible to wipers 281 and 282 are connected by way of conductors and cable C204 to bank contacts accessible to wipers 386 and 387 of the trunk identity switch. Only some of said conductors are shown, that is, the first, tenth, eleventh, twentieth, twenty-first, thirtieth, thirty-first and fortieth contacts accessible to wipers 281 and 282 are connected by way of conductors 291 to 298 respectively to the first, tenth, thirteenth, twenty-third, twenty-sixth, thirty-fifth, thirty-ninth and forty-eighth contacts accessible to wipers 386 and 387. Thus two or three contacts after each group of ten contacts in the identity switch levels are left blank. As will be described later, this is to facilitate identification of a repeater which, when tested, has failed to operate the reverse battery test relay R120.

Assume that the finder switch 200 has seized repeater 31 and that the impulsing device has transmitted the reverse battery test number to said repeater and that R240 has operated thereafter as described with respect to the test made upon repeater 1. As described with respect to the test made upon repeater 1, relays R110, R140, R150, R160 and R170 are in an operated position when R240 operates to complete an operating circuit, previously described, for the slow to operate alarm relay R130 and to prepare a circuit previously described, for operating relay R120 if there is an immediate battery reversal.

Seizure of the reverse battery test position in a connector at the attended office and seizure of only that position will cause an "immediate" battery reversal as described with respect to repeater 1. When a connector seizes an idle subscriber line, battery reversal is not accomplished until the subscriber answers the call.

If battery reversal is not immediate as a result of no connection or a wrong connection being established, R130 rather than R120 will operate and, as previously described, will light the local signal lamp 108 and will operate the alarm in the distant attended office. Also R130 opens the operating circuit of R120 at contacts 132; and, at contacts 133, prepares a circuit for starting the trunk identity switch 300.

Now when the attendant dials the check number to make connections to contacts 381, 382 and 383, relays R350 and R360 will operate in that order as previously described. When R360 operates it completes a circuit for operating slow to operate relay R310, said circuit extending from grounded contacts 133, contacts 181, conductor 198, contacts 361, 332 and 321 to the winding of R310.

At contacts 311 and 312, R310 completes obvious circuits for operating slow to release relay R320 and for energizing motor magnet M370 of the trunk identity switch. R320 opens contacts 321 to restore R310 which in turn restores magnet M370 which advances the identity switch wipers one step. R320 then releases slowly. R320 closed contacts 322 to extend a connection from the dial tone equipment to the attendant by way of contact 382 to send a first splash of tone to the attendant.

Since repeater 31 is the repeater held seized by finder switch 200, wiper 282 is in engagement with the contact terminating conductor 297, and extends ground potential over said conductor and cable C204 to contact 388 of the identity switch contact banks.

After the identity switch wipers are advanced one step as previously described, the sequential operations of R310, R320 and M370 will be repeated to advance the wipers step by step until wiper 387 encounters contact 388 which has been marked by ground potential as previously described. Each operation of R320, completes a circuit extending from the dial tone equipment (not shown) over contacts 322 and 341, bank contact 382 and the switch train by means of which the attendant seized contacts 381, 382 and 383 for sending a splash of dial tone to the attendant. Relays R310 and R320 can be adjusted to obtain a desired interval between tone splashes to facilitate counting of the splashes by the attendant.

When the identity switch wiper 384 engages the tenth, eleventh, twelfth and thirteenth contacts accessible thereto, slow to operate relay R340 is operated over a circuit extending from ground over wiper 384 and its eleventh, twelfth and thirteenth contacts 352 to R340. R340 opens, at contacts 341, the circuit for sending tone splashes to the attendant. However it will be noted that, as wiper 384 moves from the ninth to the tenth contact, a splash of tone is sent to the attendant before slow to operate relay R340 operates its contacts 341 to open the tone circuit. R340 restores rapidly however; and, as a result, when wiper 384 moves from the thirteenth to the fourteenth contact, R340 restores contacts 341 to send a splash of tone to the attendant before slow to release relay R320 can restore to open the tone circuit at contacts 321. Nine more tone splashes are sent as the wipers move the next nine steps; then R340 is again operated as wiper 384 engages the twenty-third, twenty-fourth and twenty-fifth contacts, thereby causing a short pause between the second and third groups of tone splashes. The next ten tone splashes are sent as the wipers move ten more steps; then R340 is again operated as wiper 385 engages its tenth, eleventh, twelfth and thirteenth contacts, thereby causing a short pause between the third and fourth groups of tone splashes.

As wiper 385 steps from its thirteenth to its fourteenth contact, one additional tone splash is sent to the attendant, wiper 387 engaging grounded contact 388 to complete an obvious circuit for operating slow to operate relay R330.

At contacts 332, R330 opens the operating circuit of R310 before slow to release relay R320 restores contacts 321 thereby to stop the sequential operations of R310, R320 and M370. No further tone splashes will be sent, the repeater in trouble having been identified as repeater 31. At contacts 331, R330 restores R350; at contacts 333, completes an obvious circuit including grounded wiper 385 and the multipled fourteenth to the twenty-second contacts accessible thereto for maintaining R330 operated; and, at contacts 334, completes an obvious self-interrupting operating circuit for M370 to cause said magnet to step the wiper to the twenty-third bank contact. R340 operates; but this is of no effect at this time.

When wiper 385 engages its twenty-third contact, it completes a circuit including wiper 385 and its multipled twenty-third and twenty-fourth contacts and contacts 353, 333 and 334 for maintaining R330 operated and for operating M385 to move the wipers to their original start positions as shown in the drawings. R330 and R340 then restore.

If the attendant wishes to verify the number of the repeater in trouble, he will not hang up; R350 will again operate followed by R340 and the identity switch 200 will perform the same operation to identify repeater 31 as the one in trouble.

The attendant may then check to see if switch train connections were set up in the attended office by way of the trunk associated with repeater 31 and check the attended office equipment as a possible cause of the trouble. If the trouble is located in the attended office, or even if not located, the attendant can dial a predetermined number in the unattended exchange to operate relay R105 which operates R125 over an obvious circuit. R125, as previously described, will again start the routiner so that the remaining repeaters may be tested; and R125 causes R240 to restore followed by the restoration of R130.

When the attendant releases the connections to connector bank contacts 381, 382 and 383, R360 and R350, if operated, will restore. Regardless of the position of the identity switch wipers when R350 and R360 restore, the switch will return to normal. More specifically, the thirty-six multipled contacts accessible to grounded wipers 384 and 385, contacts 364 complete a circuit when said wipers engage said contacts for operating relay R330; and the other multipled contacts accessible to wipers 384 and 385 complete an obvious circuit when engaged by said wipers for operating R330. Thus it is obvious that R330 will operate and maintain itself operated until the wipers 384, 385, 386 and 387 return to normal. As previously described, R330 operates contacts 334 to complete a self-interrupting circuit including all of the contacts accessible to wipers 384 and 385 for operating M370 to return the wipers to normal.

It will be noted that push button control contacts 102, 103 and 107 are provided in the routiner for manual control of the routiner at the unattended office.

While there has been described what is at present considered to be the preferred embodiment of the invention various modifications may be made therein; and it is contemplated to cover in the appended claims all such modifications as fall within the true spirit and scope of the invention.

What is claimed is:

1. For use in an automatic unattended telephone exchange having a plurality of trunk lines terminating in a distant attended exchange and having a repeater associated with each of said trunk lines, each repeater having incoming conductors associated therewith, an automatic routine testing mechanism for automatically testing each repeater for seizure, satisfactory impulse repetition and current reversal in its incoming conductors, said mechanism comprising a start means, means controlled by said start means for seizing each idle repeater by way of its incoming conductors, means operated in response to the seizure of an idle repeater for sending a test number impulse series to the seized repeater, means in the repeater for repeating said impulse series over the trunk associated therewith, means in each repeater for reversing connections to its incoming conductors, means associated with each trunk and controlled only in accordance with a correctly repeated test number impulse series for instantaneously operating said last means to reverse connections to the incoming conductors of the repeater which repeated the impulse series, and test means for sounding an alarm at the attended exchange and for preventing further operation of the routiner upon failure of the routiner to seize an idle repeater and upon a failure of said fifth means to instantaneously reverse the connections to the incoming conductors.

2. A routine testing mechanism as claimed in claim 1, together with means controllable by an attendant at the attended exchange for identifying the source of trouble when the alarm is sounded.

3. For use in an automatic unattended telephone exchange having a plurality of trunk lines terminating in a distant attended exchange and having a repeater associated with each of said trunk lines, each repeater having incoming conductors associated therewith, an automatic routine testing mechanism for automatically testing each repeater for seizure, satisfactory impulse repetition and current reversal in its incoming conductors, means for directly associating said testing mechanism with each repeater by way of its incoming conductors, means in each repeater operated responsive to its association with said testing mechanism for returning a marking potential to said mechanism, means in said testing mechanism operated in response to the receipt of said marking potential from an associated repeater for sending a predetermined group of digital series of impulses to said associated repeater by way of its incoming conductors, means in each repeater operated responsive to the receipt of said impulses for retransmitting them over its trunk line, means in said attended exchange and associated with said trunk lines operated only in response to the receipt of said predetermined group of impulse series for immediately reversing the connections of the trunk line over which said impulses are received, means in each repeater operated responsive to a reversal of the connections of its trunk line for effecting a current reversal in its incoming conductors, a test relay in said testing mechanism operated responsive to only an immediate current reversal in the incoming conductors of a repeater associated with said mechanism, and means in said test mechanism whereby said first means is controlled by the operation of said test relay for disassociating said mechanism from a tested repeater and for associating the mechanism with the next repeater.

4. In a combination as claimed in claim 3, an alarm in said attended office, means in said testing mechanism operated responsive to the failure of an idle selected repeater to return said marking potential for operating said alarm, means in said testing mechanism operated responsive to the failure of a repeater to immediately reverse the current flow in its incoming conductors upon receipt of said impulses for operating said alarm, a connector bank terminal in the unattended exchange and associated with the testing mechanism, means for extending uninterrupted dial tone to said terminal when the repeater fails to return the marking potential, and means for extending an intelligible series of interrupted splashes of dial tone to said terminal when the repeater fails to reverse current flow in its incoming conductors.

5. In a combination as claimed in claim 4, a start means in the routiner, means controlled by said start means for operating said first means to associate said testing mechanism with the first accessible repeater, means responsive to said testing mechanism encountering a busy repeater for operating said first means to select the next repeater.

6. In a combination as claimed in claim 5, means in said testing mechanism controllable from said distant attended office for operating said first means to disassociate the testing mechanism from a faulty repeater and to associate it with the next accessible repeater.

7. An automatic test mechanism for use in the automatic unattended exchange of a telephone system having an attended exchange and an automatic unattended exchange and trunk lines connecting said exchanges, said unattended exchange having a repeater associated with each of said trunks, each repeater having incoming conductors over which the repeater is seized, on which a marking potential is established and over which impulses are received, and means for repeating said impulses over its associated trunk to establish connections to any one of a plurality of attended exchange connector bank positions including a reverse battery test position, said attended exchange having means for instantaneously reversing current flow in one of said trunk lines only upon connection of said trunk line to said test position, each repeater further having means for reversing current flow in its incoming conductors upon a current reversal in its associated trunk line, and said unattended exchange having a first and second special connector bank positions associated with said test mechanism and accessible from said attended exchange by way of an inter-exchange switch train, said test mechanism comprising means for connecting said test mechanism to each of said repeaters by way of its incoming conductors, means operated in response to the subsequent establishment of said marking potential on the repeater connected to said test mechanism for generating and transmitting to said connected repeater a predetermined group of digital series of impulses by way of said repeater's incoming conductors, said connected repeater repeating said impulses to cause its associated trunk to be extended to said test position to cause instantaneous current reversal in its associated trunk and incoming conductors, test means operated responsive only to an instantaneous current reversal, said fourth means operated in response to the operation of said test means for disconnecting the test mechanism from the connected repeater and for connecting said test mechanism to the next repeater, means operated when a connected repeater fails to establish marking potential and when it fails to cause an instantaneous current reversal for operating an alarm and for preventing further continuation of the testing procedure, means for extending a distinguishing tone signal to said first special bank position when a connected repeater fails to establish said marking potential, and means for extending an intelligible predetermined series of interrupted tone signals to said first special bank position when a connected repeater fails to cause an instantaneous current reversal, thereby to identify said connected repeater.

8. An automatic test mechanism as claimed in claim 7 wherein said fifth means comprises a pulsing relay having contacts for sending an impulse to a connected repeater upon each operation and restoration of the pulsing relay, a circuit completed upon the establishment of said marking potential for operating said pulsing relay, a pair of switches having wipers with normal positions and bank contacts accessible to said wipers, successive contacts of one of said switches connected to predetermined contacts of the other switch, a first magnet means associated with said other switch operated in response to each operation of said pulsing relay, an interrupter relay operated and effective in response to each operation of said pulsing relay but after the operation of said first magnet means for opening said circuit to restore said pulsing relay, said first magnet means and said interrupter relay restoring in response to each restoration of said pulsing relay for respectively moving the wipers of said other switch one step and for closing said circuit to reoperate the pulsing relay, means operated and effective when the wipers of said other switch encounter a predetermined contact connected to the contact upon which the wiper of said one switch is standing for opening said circuit to momentarily prevent further operation of said pulsing relay and for restoring the wiper of said other switch to normal, a second magnet means associated with said one switch, means operated and effective when said other switch reaches its normal position for operating said second magnet means to advance the wiper of said one switch one step and for closing said circuit to operate said first relay, means operated and effective when the wiper of said one switch encounters a predetermined contact accessible thereto for restoring said wiper to normal and for preventing further operation of the pulsing relay.

9. An automatic test mechanism as claimed in claim 7 wherein said last means comprises a switch having wipers with a normal position and two groups of contacts accessible to the wipers, contacts in each of said groups corresponding to one of the repeaters to be tested, the contacts corresponding to repeaters arranged in subgroups of ten contacts with non-corresponding contacts between said subgroups, means for marking one of the contacts corresponding to the connected repeater, magnet means for advancing said wipers, a pair of relays, a circuit completed when an attendant makes connections to said first special bank position after the alarm has been operated in response to the failure of a connected repeater to reverse current flow in its incoming conductors, means responsive to the completion of said circuit for cyclically operating said pair of relays, means responsive to each cyclical operation of said relays for operating said magnet means to advance the wipers one step, a signalling circuit for extending a tone to said first special bank position, means operated for momentarily completing said signalling circuit in response to a cyclical operation of said pair of relays while the wipers are being advanced to contacts corresponding to a repeater, means operated upon said wipers being advanced to non-corresponding contacts for preventing the completion of said signalling circuit and operated upon said marked contact being encountered by the wiper having access thereto for thereafter preventing completion of said signalling circuit, an identifying intelligible series of tone splashes thereby being extended to said first special bank position to which position the attendant has made connections.

10. In a test mechanism as claimed in claim 7, a start means, means for operating said start means, said fourth means operated responsive to the operation of said start means to connect said test mechanism to the first accessible repeater, means controlled from the attended exchange by way of said second special bank position for operating said fourth means to disconnect the test mechanism from a faulty repeater upon which said test mechanism has stopped and to connect said test mechanism to the next accessible repeater to continue the series of tests.

11. For use in an automatic unattended telephone exchange having a plurality of trunk lines terminating in a distant attended exchange and having a repeater associated with each of said trunk lines, each repeater having incoming conductors associated therewith, an automatic routine testing mechanism for automatically testing each repeater for seizure, satisfactory impulse repetition and current reversal in its incoming conductors, a switch having access to said repeaters, a start means, means controlled by said start means for operating said switch, means to select the first repeater, means operated responsive to said selection for seizing said repeater if it is idle, certain battery connections normally associated with said trunk, means for automatically generating a predetermined group of digital series of impulses, means whereby said last means is operated responsive to said seizure, means in the seized repeater for repeating said impulses over its associated trunk, a connector test position, means associated with said associated trunk for connecting said trunk to said test position, means whereby said last means is operated in response to said repeated impulses, means operated upon completion of said connection and only said connection for immediately reversing said battery connections to said trunk, means operated only in response to immediate battery reversal for operating said second means to cause the switch to select the next trunk, means for preventing further operation of the switch and for operating an alarm, means whereby said last means is operated if battery connections are not immediately reversed, means whereby said second means is operated when a busy trunk is selected to cause the switch to select the next repeater, means controlled by an attendant in the attended office for establishing connections to said testing apparatus, means controlled by the failure of said switch to seize an idle repeater for sending an identifying signal to said attendant by way of said last-mentioned connections, means controlled by the failure of an immediate reversal of battery connections to a tested trunk for sending an intelligible trunk identifying code to said attendant by way of said connections, and means associated with said testing apparatus but controlled by said attendant from the attended exchange for again operating the switch.

12. For use in an automatic test mechanism which tests each component in a group of similar components of a telephone system, an automatic faulty component identifying device comprising a plurality of markable elements each of which corresponds to one of said components, a start means operable after the detection by said test mechanism of a faulty component, means for marking the element corresponding to the faulty component, means for sequentially testing each of said elements for said marking, means operated upon said last means encountering said marking to prevent further testing, a faulty component identifying means controlled by said testing means for sending a perceptible signal for each successive test made on said elements.

13. For use in an automatic test mechanism which tests each repeater and its associated trunk in an unattended telephone exchange for faults, a faulty repeater identifying device comprising a switch having wipers and a plurality of bank contacts accessible to the wipers with certain of said contacts corresponding to said repeaters, a start means operable when a fault is detected by the test mechanism, means for marking the bank contact corresponding to the repeater detected as faulty, means controlled by the start means for sequentially stepping the wipers to succeeding bank contacts, circuit means operated and effective for sending an identifying signal whenever the wipers engage a contact corresponding to a repeater, a test means operated when the wipers engage said marked contact to prevent further operation of said circuit means, the number of signals sent by said circuit means thereby identifying the repeater detected as faulty.

14. A device as claimed in claim 13 wherein said third means comprises a wiper driving means and a pair of timing relays, means controlled by the start means for operating one of said timing relays, means operated responsive to each operation of said one timing relay for operating the other timing relay and for preparing the driving means, means operated responsive to each operation of the other timing relay for restoring the one timing relay, means operated responsive to each restoration of the one timing relay for restoring the other timing relay and for operating the driving means to move the wipers one step.

15. For use in a first telephone exchange having a plurality of trunk lines terminating in a second exchange and having a repeater associated with each of said trunk lines, each repeater having incoming conductors associated therewith, an automatic routine testing mechanism for testing each repeater for satisfactory impulse repetition and for current reversal in its incoming conductors, said mechanism comprising a start means, means controlled by said start means for seizing each idle repeater by way of its incoming conductors, means operated in response to the seizure of an idle repeater for sending a test number impulse series to the seized repeater, means in the repeater for repeating said impulse series over the trunk associated therewith, means in each repeater for reversing connections to its incoming conductors, means associated with each trunk controlled normally in response to subscriber number impulse series for establishing connections between subscribers in the first exchange and subscribers in the second exchange and controlled only in response to a correctly repeated test number impulse series for instantaneously operating said last means to reverse connections to the incoming conductors of the repeater which repeated the impulse series, and test means for indicating a fault upon a failure of said fifth means to instantaneously reverse the connections to the incoming conductors.

16. The routine testing mechanism claimed in claim 15 in which said test means prevents further operation of the routiner upon a failure of said fifth means to instantaneously reverse the connections to the incoming conductors.

17. The routine testing mechanism claimed in claim 15 together with means controlled from the second exchange by an attendant for identifying the source of trouble when a fault is indicated.

18. The routine testing mechanism claimed in claim 15 together with means in the mechanism controlled from either exchange for again operating the mechanism to test the remaining repeaters.

References Cited in the file of this patent

UNITED STATES PATENTS

| | | |
|---|---|---|
| 1,842,811 | Wicks | Jan. 26, 1932 |
| 2,632,817 | Kessler | Mar. 24, 1953 |